United States Patent
Simpson et al.

(10) Patent No.: US 7,742,520 B2
(45) Date of Patent: Jun. 22, 2010

(54) EQUALIZATION CIRCUIT

(75) Inventors: Richard Simpson, Carlton (GB); Ruediger Kuhn, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 569 days.

(21) Appl. No.: 11/367,660

(22) Filed: Mar. 3, 2006

(65) Prior Publication Data

US 2007/0002942 A1    Jan. 4, 2007

(30) Foreign Application Priority Data

Mar. 3, 2005    (GB) ................................. 0504425.0

(51) Int. Cl.
*H03H 7/30* (2006.01)
(52) U.S. Cl. ...................... 375/229; 375/230; 375/232; 375/354; 375/355; 375/360; 708/320; 708/322
(58) Field of Classification Search ................ 375/130, 375/135–137, 145–148, 213, 219, 229, 232, 375/260, 294, 327, 354–355, 326, 345, 359, 375/360; 708/320, 322
See application file for complete search history.

(56) References Cited

U.S. PATENT DOCUMENTS

| 6,055,269 | A | 4/2000 | Drost et al. |
| 7,313,181 | B2* | 12/2007 | Balamurugan et al. ...... 375/232 |
| 7,315,596 | B2* | 1/2008 | Payne et al. ................. 375/355 |
| 7,505,541 | B1* | 3/2009 | Brunn et al. ................ 375/360 |
| 2005/0047500 | A1 | 3/2005 | Gupta et al. |
| 2005/0180536 | A1* | 8/2005 | Payne et al. ................. 375/354 |
| 2005/0201491 | A1* | 9/2005 | Wei ............................ 375/326 |
| 2006/0140321 | A1* | 6/2006 | Tell et al. .................... 375/376 |
| 2006/0280272 | A1* | 12/2006 | Stojanovic .................. 375/355 |
| 2008/0002763 | A1* | 1/2008 | Wei et al. .................... 375/232 |
| 2008/0069276 | A1 | 3/2008 | Wong et al. ................. 375/350 |
| 2008/0298520 | A1* | 12/2008 | Hsu et al. .................... 375/345 |

* cited by examiner

*Primary Examiner*—Shuwang Liu
*Assistant Examiner*—Hirdepal Singh
(74) *Attorney, Agent, or Firm*—John J. Patti; Wade J. Brady, III; Frederick J. Telecky, Jr.

(57) ABSTRACT

An equalization circuit that allows particularly for lowpass filtering by transmission lines comprises a compensating equalizer controlled according to whether the edges between bits in the data waveform are early or late. Adjusting the equalization causes edges to appear in the same place, whereas if the adjustment is incorrect certain edges will be late and certain edges will be early depending on the history of "1"s and "0"s in the data stream. This is an effect of so-called intersymbol interference. The control mechanism includes circuits for recognizing patterns of "1"s and "0"s in the recent history of the data waveform whose occurrence is used to trigger the adjustment of the equalizer.

18 Claims, 8 Drawing Sheets

EQUALIZATION CIRCUIT

The invention relates to the equalization of a data waveform in order to improve sampling accuracy.

BACKGROUND

FIG. 1 shows the waveform of an idealized data signal waveform. In this case, binary "1"s are represented by a particular relatively high voltage level and binary "0"s by a particular relatively low voltage level. However, when such signals are transmitted through real data transmission lines, the waveform can become filtered; in particular at high data rates the capacitance of the transmission lines can be significant and acts to give the transmission lines a low pass characteristic. Such a situation arises, for example, in the data transmission lines of the backplane of a multi-card electronic system.

FIG. 2 shows a data waveform like that of FIG. 1 after it has been passed through a transmission line of significant capacitance. (There are approximately 50 bits in the time frame of the figure.) As can be seen, there is a difficulty in sampling the data because the sections of the waveform representing "1"s are not always above the threshold level and the sections representing "0"s are not always below the threshold level, the threshold level being that used to discriminate between "1"s and "0"s, which in this case is zero volts. This means that "1"s can be incorrectly sampled as "0"s and vice versa.

A known solution to this problem is to pass the data waveform through an equalizing filter before it is sampled. The equalizing filter is given an inverse filter characteristic to that of the transmission line, thus compensating for it and restoring the waveform to something near ideal (i.e. like FIG. 1), which can then be cleanly sampled. A problem with this approach is that the amount of equalization required can vary from installation to installation of even nominally the same equipment and can vary with time, even in the same installation. If insufficient equalization, or indeed too much equalization, is provided, then data sampling errors can still occur.

A known equalizing filter employed to solve this problem is shown in FIG. 3. Here the data waveform received from a transmission line 1 is applied in parallel to a set of band pass filters 2, which have neighbouring pass bands. The outputs of the filters are recombined with a summing amplifier 3. Each filter 2 has its gain set by an automatic gain control so that each band contains the same signal power.

A problem with the circuit of FIG. 3 is that the assumption that each band has the same signal power is incorrect. The signal spectrum is not always flat and, of course, the spectrum also depends on the channel coding scheme used and can vary from time to time with the content of the data stream.

The invention therefore provides a different kind of equalization that attempts to avoid this problem and which has other advantages, as will become apparent.

SUMMARY

The invention generally provides an equalizer comprising a controllable equalization circuit connected to receive a data waveform, and to receive a control signal, and arranged to apply an equalization to the data waveform in accordance with the control signal and provide a resultant waveform; a data sampler connected to receive the resultant waveform from the equalization circuit and to provide data sampled from the resultant waveform; an early/late detector connected to receive the resultant waveform, arranged to examine the resultant waveform to determine whether transitions between logic levels fall earlier or later than expected and to provide indications of that: and a control circuit connected to receive the data samples and the early/late indications from the early/late detector, arranged to determine from those signals whether the equalization needs to be adjusted, and connected to provide accordingly the control signal to the equalization circuit.

The control circuit may be arranged to generate the control signal from a pattern of data samples received and from information as to whether a transition between two consecutive samples of that pattern is early or late. The control circuit may be responsive, to generate the control signal, to a plurality of different patterns of data samples and to information as to whether a transition between two consecutive samples of those patterns is early or late. The control circuit may be arranged to use a particular one of the patterns of samples to indicate that the equalization should be adjusted in a particular direction and to use a different particular one of the patterns of samples to indicate that the equalization should be adjusted in the opposite direction.

In a particularly preferred form of the invention, the control circuit is arranged to generate the control signal in response to the occurrence of particular patterns of data samples received and from information as to whether a transition between two consecutive samples of each pattern is early or late according to the following rules: 1) providing a control signal indicating an increase in the equalization to be provided by the equalization circuit if both (i) the samples and early/late indication for a relatively long run of a particular logic level in the data followed by a transition and those for a relatively short run of a particular logic level followed by a transition both indicate that the equalizer is providing underequalization and (ii) no pattern to which the control circuit is responsive and its corresponding early/late indication indicates that the equalizer is providing overequalization; and 2) providing a control signal indicating a reduction in the equalization to be provided by the equalization circuit if both (i) the samples and early/late indication for a relatively long run of a particular logic level in the data followed by a transition and those for a relatively short run of a particular logic level followed by a transition both indicate that the equalizer is providing overequalization and (ii) no pattern to which the control circuit is responsive and its corresponding early/late indication indicates that the equalizer is providing underequalization. These rules ensure that the recognized patterns in the data consistently identify that there is under- or over-equalization so that generally other displacements of transitions, e.g., due to jitter or other noise, are not identified as under- or over-equalization.

The equalizer may be so arranged that the control circuit applies its rules to data samples received within a particular period of time, the rules being reapplied for later particular periods of time. The control circuit may comprise one or more code recognizers connected to detect when a particular pattern of samples has been received. The code recognizer, or recognizers, may be arranged to recognize a particular combination of: (i) a particular pattern of received samples, and (ii) one of either the transition between two samples of the pattern being early or late, and to output a signal indicating that that combination has been recognized. The equalizer may comprise a discriminator connected to receive the outputs of a plurality of code recognizers and arranged, in response thereto, to provide an overall signal indicating how the equalization circuit is to be adjusted. The controllable equalization circuit may comprise a filter having gain that is adjustable in a particular range of frequencies, which is connected to be so adjusted by the control signal from the control circuit. The filter may comprise an adjustable resistance that is connected to be adjusted by the control signal from the control circuit.

The filter may comprise a second data sampler connected to receive the resultant waveform and to provide samples thereof at the expected points of transitions between logic levels in the waveform, wherein the early/late detector is connected to receive those samples and also the resultant waveform in sampled form from the first data sampler, and is arranged to provide its early/late indications based on the sampled from the two data samplers. The equalizer may comprise an error detect unit responsive to the data samples and connected to the control circuit to signal the occurrence of errors or the rate of those errors, the control circuit being arranged to vary the equalization provided in a particular manner until the errors meet a criterion, the control circuit thereafter being responsive to the data samples and the early/late information to control the controllable equalization circuit.

The invention also provides a system comprising a source of a data waveform; an equalizer as described previously; and a data transmission line connected to deliver the data waveform to the controllable equalization circuit, of the equalizer, as its input. The controllable equalization circuit may comprise a filter having a high pass characteristic. The high pass filter characteristic may have a pass band including the frequency of half the data rate of the data waveform. The position of the pass band in frequency may be programmable.

The invention further provides a method of equalization, comprising the steps of: receiving a data waveform; applying an equalization to the data waveform to provide a resultant waveform; examining the resultant waveform to determine whether transitions between logic levels therein fall earlier or later than expected and to provide indications of that; sampling the resultant data waveform; in response to the samples and the early/late indications adjusting the equalization applied. The adjusting may be in response to the occurrence of one or more particular patterns of the samples and to whether the transition between two consecutive samples of that pattern is early or late. The adjusting may be in one particular direction in response to the occurrence of one particular pattern and is in the opposite direction in response to the occurrence of another particular pattern. The adjusting may comprise combining indications of adjustment derived from various particular patterns of samples into an overall indication of how the equalization is to be adjusted and adjusting the equalization accordingly.

In a particularly preferred form of the invention the adjusting of the equalization is performed as follows: taking into account the occurrence of any of a plurality of particular patterns in the data samples and whether a transition between two consecutive samples of each pattern is early or late; increasing the equalization if both (i) the samples and early/late indications for a relatively long run of a particular logic level in the data followed by a transition and those for a relatively short run of a particular logic level followed by a transition both indicate that there is underequalization and (ii) no occurrence of a pattern of the plurality and its corresponding early/late indication indicates that there is overequalization; and reducing the equalization if both (i) the samples and early/late indications for a relatively long run of a particular logic level in the data followed by a transition and those for a relatively short run of a particular logic level followed by a transition both indicate that there is providing overequalization and (ii) no occurrence of a pattern of the plurality and its corresponding early/late indication indicates that there is underequalization. The criteria (i) and (ii) for the increasing or reducing of the equalization may be applied to data samples received within a particular period of time, the criteria being re-evaluated for later particular periods of time.

The equalization may be adjusted by adjusting the gain applied to the data waveform in a particular range of frequencies.

The method may comprise detecting errors in the data samples, and varying the equalization provided in a particular manner until the errors meet a criterion, and thereafter adjusting the equalization applied in response to the data samples and the early/late information. The equalization applied may have a high pass characteristic. The high pass filter characteristic may have a pass band including the frequency of half the data rate of the data waveform. The examining the resultant waveform to determine whether transitions between logic levels therein fall earlier or later than expected at the expected points of transitions between logic levels in the waveform may comprise determining from two consecutive samples of the data waveform and the sample taken at the expected point of transition between them whether the transition is earlier or later than expected.

BRIEF DESCRIPTION OF THE DRAWINGS

Example embodiments of the invention are described, with reference to the accompanying drawings, wherein.

DETAILED DESCRIPTION OF THE EMBODIMENTS a1

Figure 4:
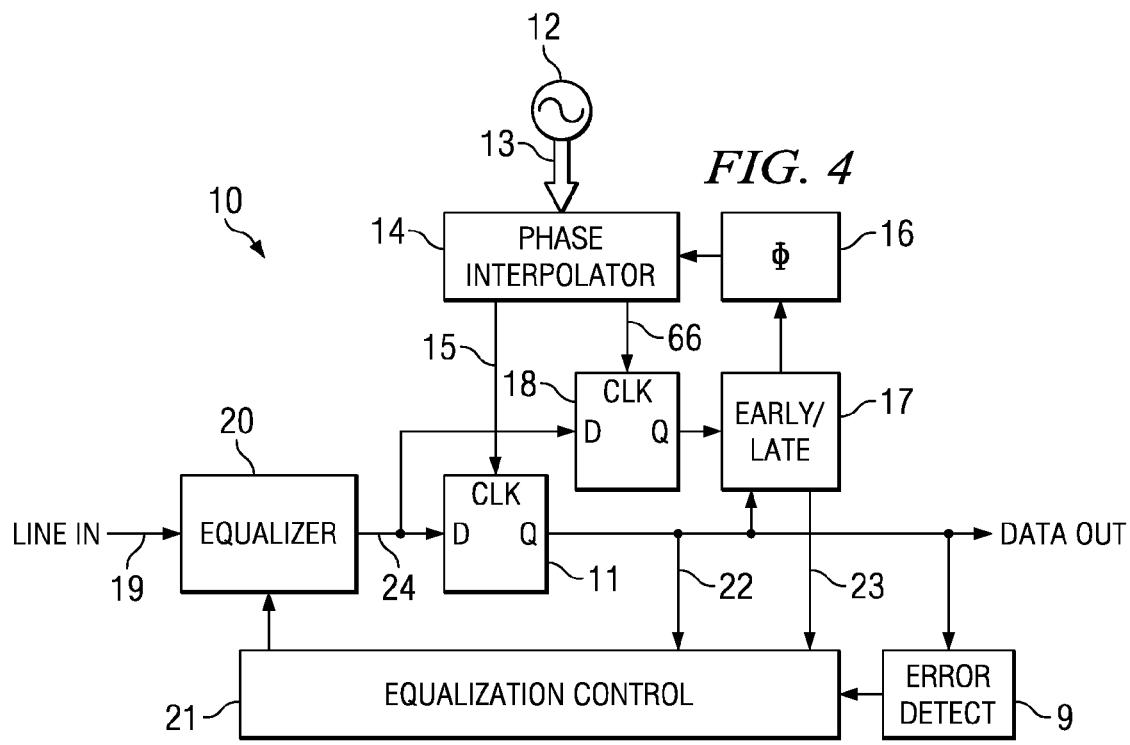
FIG. 4 is a data reception circuit employing the invention.

FIG. 4 shows a typical data reception circuit 10 which further incorporates equalization circuitry according to the invention. The typical elements of the data reception circuit are a data sampling latch 11, a local oscillator circuit 12 providing a plurality of clock phases 13, and a phase interpolator 14 connected to select as its output 15 a particular one of those phases, or a phase interpolated between two of them, under the control of a phase selector 16. The selected phase 15 is controlled so that the latch 11 samples the data waveform at points away from the different transitions or edges, usually halfway between the points at which transmissions may occur. Additionally, data sampling latch 11 can comprise a data sampler; however, a data sampler can also include latch 18, phase interpolator 14, oscillator 12, and/or phase selector 16.

Various techniques are known in the art for ensuring that the selected phase, which is known as the local clock, has the correct phase relationship with the data waveform and for ensuring that it copes with problems such as jitter. The technique shown here, since it is convenient to the invention, is to provide an early/late logic circuit 17, which samples the data waveform at the expected points of transitions (e.g. as marked at 6 in FIG. 1) and draws conclusions therefrom as to whether the phase of the local clock 15 should be advanced or retarded. Such early/late logic circuits are known in the art. (Other mechanisms for providing the local clock and keeping it in the correct phase relationship with the data are, however compatible with the invention. Some techniques do not employ a phase interpolator but control the oscillator directly.)

In this example of the invention, there are provided an equalization circuit 20 and a control circuit 21 for it. As will be described below, the control circuit 21 is responsive to recently sampled data values 22 and to indications 23 of whether the transitions in the received data waveform are early or late to control the equalization circuit 20. How the control circuit 21 ensures the correct equalization is discussed later below.

Figure 5:
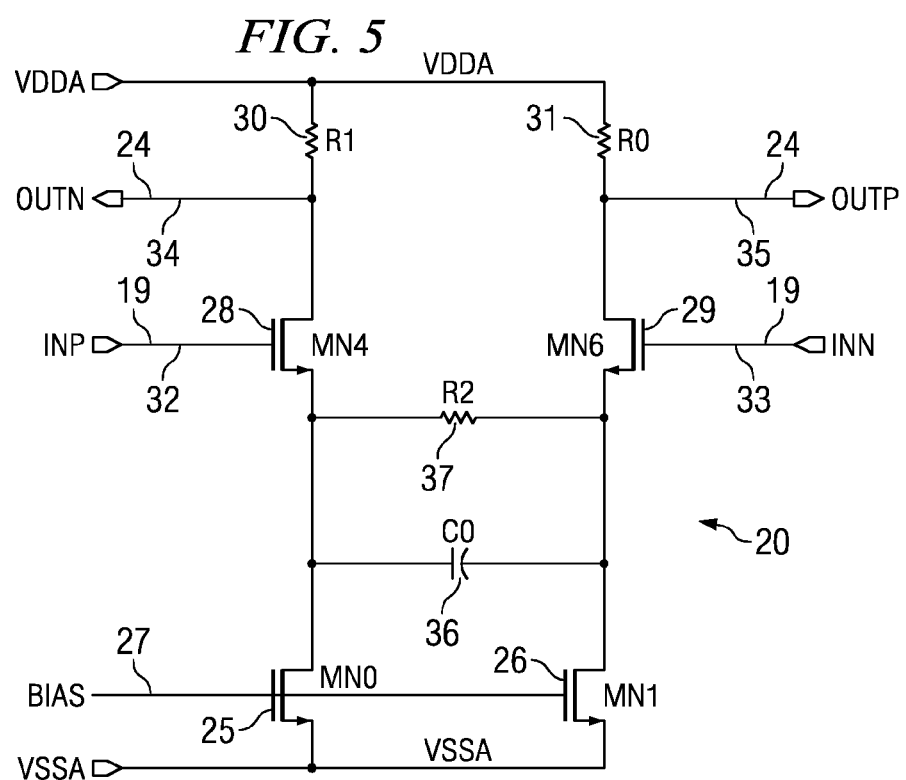
FIG. 5 is an exemplary equalization circuit.

FIG. 5 is a circuit diagram of the equalization circuit 20 used in this example, which is of simple construction (which is an advantage in itself) but many other filter type circuits could be used. The exemplary circuit 20 is a differential amplifier. The two limbs of the circuit each have a respective current source 25 and 26, which in this example are provided by respective NMOS transistors having their sources connected to the ground supply VSSA and their gates connected to a common bias voltage 27. In each limb the output of the current source 25,26 (the drain of the transistor) is connected to the other power supply VDDA via a respective input transistor 28, 29 and a respective resistive load 30,31, which in this example are resistors. The input transistors 28,29 are controlled by respective ends 32,33 of the differential input signal, namely the data waveform (19 in FIG. 4) that needs to be equalized. In this particular example, each input transistor is an NMOS transistor with its source connected to its respective current source, its drain connected to its respective resistive load and its gate connected to its respective end of the input signal. The equalized differential output signal is taken from the nodes 34, 35 between the input transistors and the resistive loads. This output signal (24 in FIG. 4) can then be sampled more reliably to recover the data.

A capacitor 36 is connected between the outputs of the two current sources and at high frequencies shorts them so that the circuit 20 has effectively a single common current source supplying the two limbs and operates normally as a differential amplifier, the operation of which is well-known.

A resistor 37 is also connected between the outputs of the two current sources. Without that resistor in place, at lower frequencies the output voltage at nodes 34 and 35 would be constant, being set by the current provided by the respective sources 25, 26 and the resistance of respective loads 30,31. The circuit therefore operates as a high pass filter.

The value of the capacitance C affects the frequency at which the stop band of the high pass filter ends. In this example it is chosen by the designer of the circuit so that the highest significant signal frequency is passed by the filter while lower frequencies are attenuated. It is notable therefore that to achieve effective equalization the transition of the high pass filter does not have to be in exactly the same position as that of the low pass filter of the line, which is useful since it avoids having to determine the position of that transition which will vary from installation to installation. Different installations will have different data rates, but they are generally known and so preferably the value of the capacitor is made to be selectable by the user so that the filter can be adapted to the data rate in use.

Returning to the function of the resistor 37, with that resistor actually in place, some current flows between the two amplifiers and so there is some amplification of the input signal. The value of resistor 37 therefore sets the gain in the stop band of the filter.

In FIG. 5 the resistor 37 is shown as a simple fixed resistor. The value of this resistor 37 is in fact variable and is controlled by the control circuit 21 so that the level of equalization provides the best data sampling, using feedback from the sampling as is described later below. (Generally this will occur when the overall frequency characteristic of the transmission line over which the data waveform is received combined with that of the equalizing circuit 20 is flat.)

Figure 6:
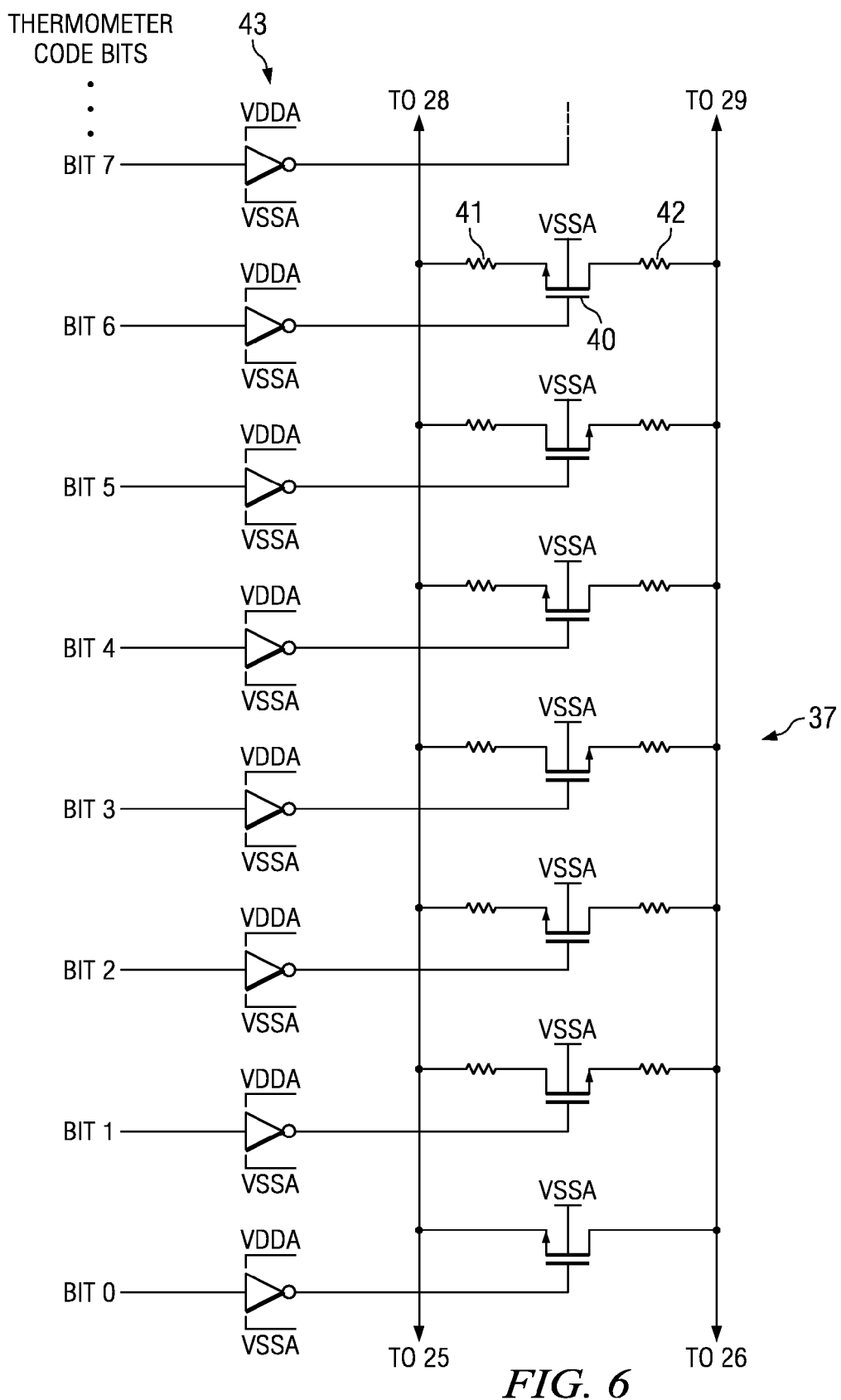
FIG. 6 is a variable resistance circuit used in the circuit of FIG. 5.

FIG. 6 shows the variable resistor 37 in detail. The control circuit 21 in this example provides a sixteen bit thermometer code to control the equalization circuit 21. In a thermometer code the code word comprises all "1"s at one end of the code word and all "0"s at the other, the position of the boundary between them determining the value of the word, as is shown in Table 1 below.

TABLE 1

| Code Value | Thermometer Code Bit 15 . . . Bit 0 | Number of resistors switched in | Value of resistor switched in by least significant "0" of the Thermometer Code | Value of R37 - i.e. Combined value of resistors in parallel |
|---|---|---|---|---|
| 0 | 0000000000000000 | 15 plus Short Circuit | Short Circuit | 0 |
| 1 | 0000000000000001 | 15 | 53 | 25 |
| 2 | 0000000000000011 | 14 | 143 | 46 |
| 3 | 0000000000000111 | 13 | 254 | 69 |
| 4 | 0000000000001111 | 12 | 390 | 94 |
| 5 | 0000000000011111 | 11 | 550 | 124 |
| 6 | 0000000000111111 | 10 | 736 | 160 |
| 7 | 0000000001111111 | 9 | 934 | 205 |
| 8 | 0000000011111111 | 8 | 1200 | 264 |
| 9 | 0000000111111111 | 7 | 1478 | 338 |
| 10 | 0000001111111111 | 6 | 1794 | 438 |
| 11 | 0000011111111111 | 5 | 2150 | 580 |
| 12 | 0000111111111111 | 4 | 2550 | 793 |
| 13 | 0001111111111111 | 3 | 2992 | 1151 |
| 14 | 0011111111111111 | 2 | 3488 | 1872 |
| 15 | 0111111111111111 | 1 | 4040 | 4040 |
| 16 | 1111111111111111 | 0 |  | Infinite |

As shown in FIG. 6 each bit of the thermometer code word is applied to a the gate of respective transistor 40 which is connected to switch in or out of the circuit a respective resistor connected between the outputs of the two current sources 25, 26 (see FIG. 5). Each resistor is split into two resistors 41 and 42 connected in series with the transistor between them. This keeps the circuit symmetrical and avoids the capacitance of the transistor 40 affecting one limb of the equalization circuit more than the other. In FIG. 6 only the transistors for bits 0 to 7 are shown but of course similar transistors and resistors are provided for 8 to 15. For bit 0 the value of the resistances switched in are zero (i.e. conductors instead of resistances are provided), which of course short circuits the two limbs of the equalization circuit.

The values of the resistors used in a particular example are give in Table 1 above. They are designed to give equal steps in gain on logarithmic scale. (Note that in the thermometer code used a "0" is used to represent that the respective resistor should be switched in. Since the transistors used to switch in the resistors are NMOS the bits of the thermometer code are there therefore inverted (using inverters 43) before they are applied to the NMOS switches.)

Figure 7:
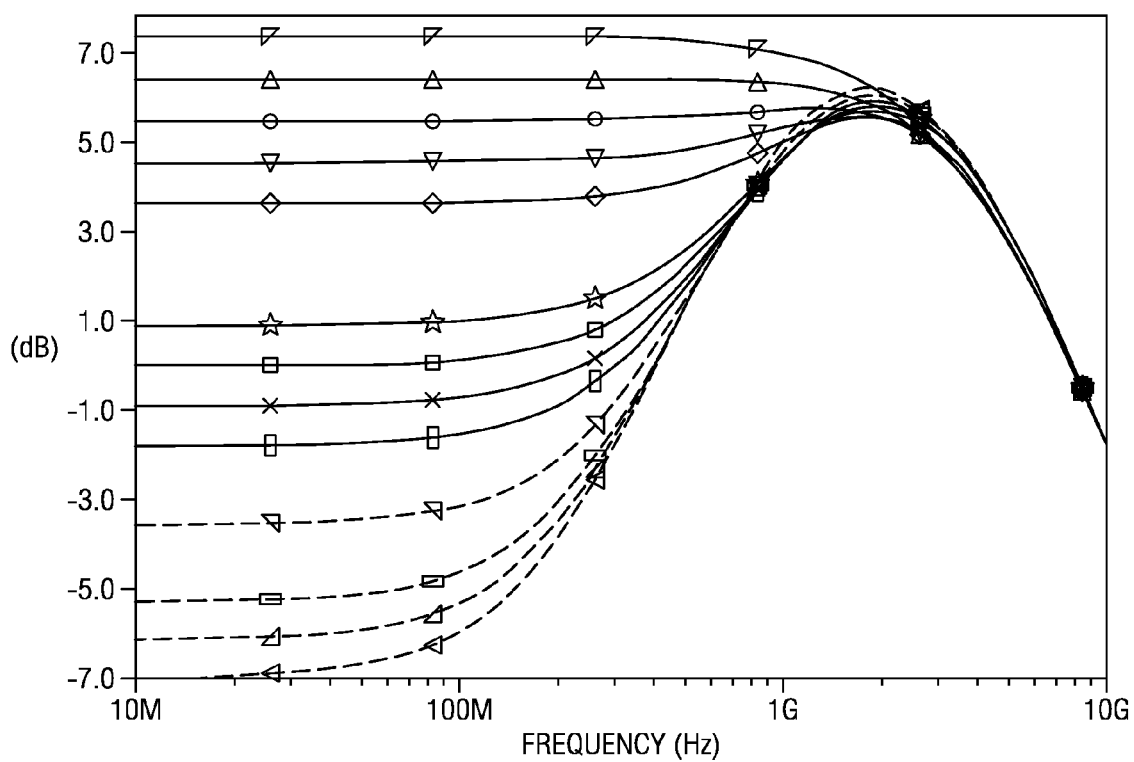
FIG. 7 shows the frequency response of the equalization circuit as the resistance is varied.

FIG. 7 shows the frequency response of the equalization circuit as the resistance 37 is varied. For this graph the capacitance was chosen for a data rate of 4 Gbps which has a highest (i.e. for the series "10101010 . . . ") fundamental frequency of 2 GHz. 2 GHz is at the maximum of the pass band, with lower frequencies in the transition to the stop band or in the stop band itself being attenuated. The FIG. shows that there is roll off above 2 GHz. In principle the filter could be designed so that frequencies higher than 2 GHz are not attenuated relative to the 2 GHz frequency. This is unnecessary effort since these higher frequencies only serve to make the transitions of the data waveform sharper (i.e. looking more like the ideal square wave of FIG. 1). More rounded waveforms (sinusoidal in the case of "10101010 . . . ") can be effectively sampled and the data recovered because the sampling of the data occurs away from the transitions. The equalization circuit nonetheless combats inter symbol interference because frequencies lower than the fundamental of "10101010 . . . " are relatively attenuated.

Other forms of controllable resistance circuit are known and can be used. The thermometer code controlled example above has the advantage that only one bit is changed at a time (see later below) and so only one resistor is switched out at a time, which removes glitches.

While a double ended or differential equalization circuit has been shown, the invention is not limited to this and single ended (where the signal is referenced to a constant level—e.g. a power supply) equivalent circuits are possible.

Further, the invention is not limited to any particular design of equalization circuit or form of response characteristic provided by it. Indeed if the line provides a filtering function other or more complicated than a simple low pass RC type filtering, as is the example given herein, then it would be appropriate to provide the equalization circuit with the complementary characteristic.

Returning now to the overall circuit in FIG. 4, the control circuit 21 determines, from the indications 23 of whether edges are later or earlier than expected, whether not enough or too much equalization is being provided. If insufficient equalization is being provided it (in the case that the equalization circuit is that of FIG. 5) reduces the gain in the stop band, thereby increasing the difference in gain between the stop band and the pass band hence increasing the level of equalization; this it does by increasing the value of the resistance 37 by increasing the number of "1"s in the thermometer code so that more of the resistances 41, 42 (FIG. 6) are switched out. If too much equalization is being provided it does the opposite.

Figure 8A:
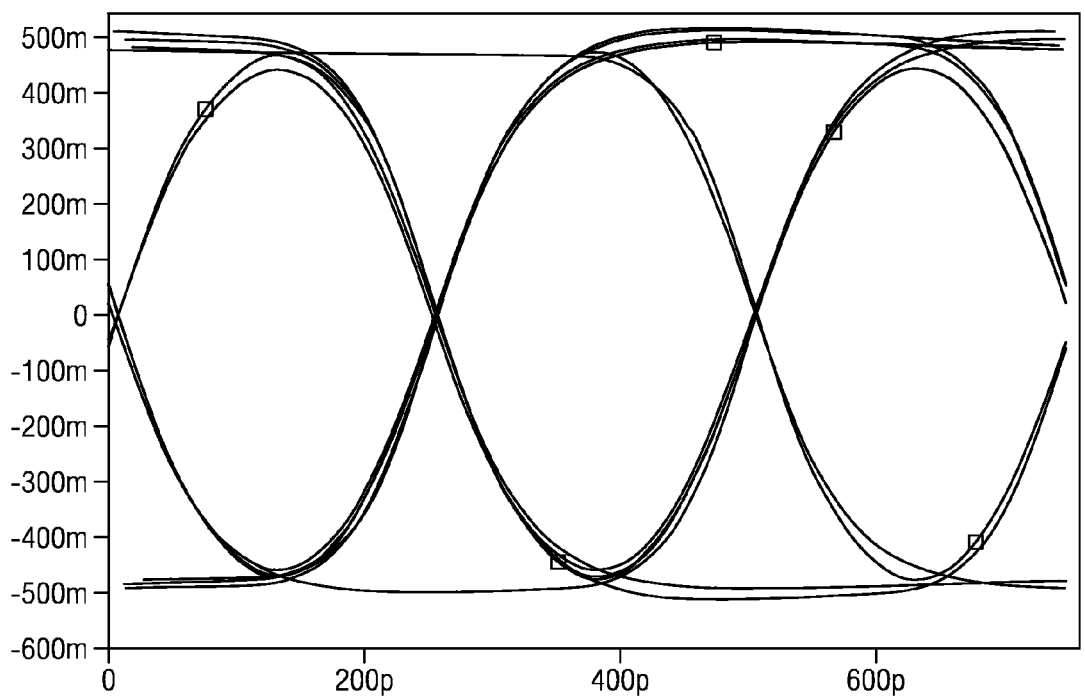
FIG. 8a is a waveform plot showing a data waveform ideal following ideal equalization.
Figure 8B:
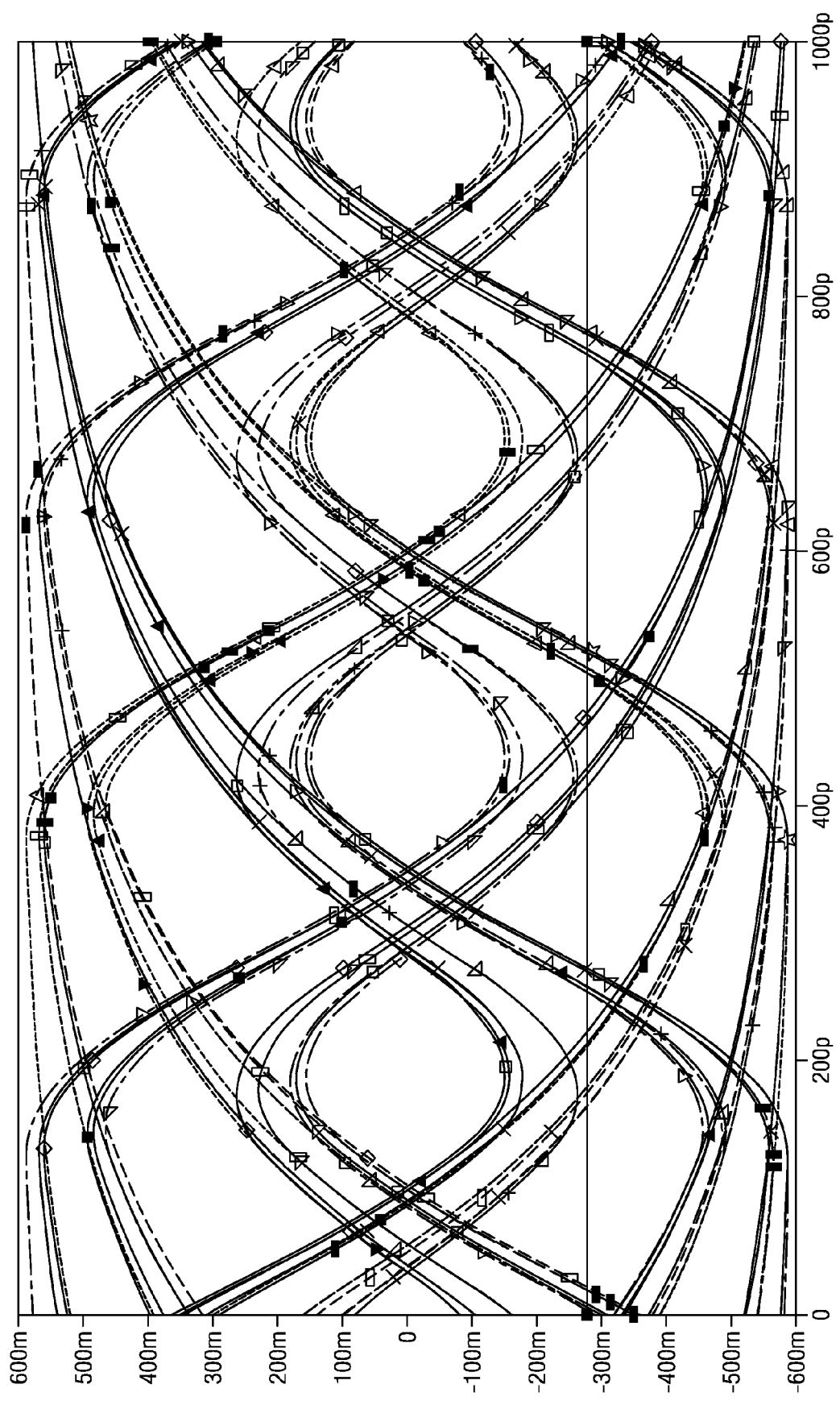
FIG. 8b is a waveform plot showing underequalization.
Figure 8C:
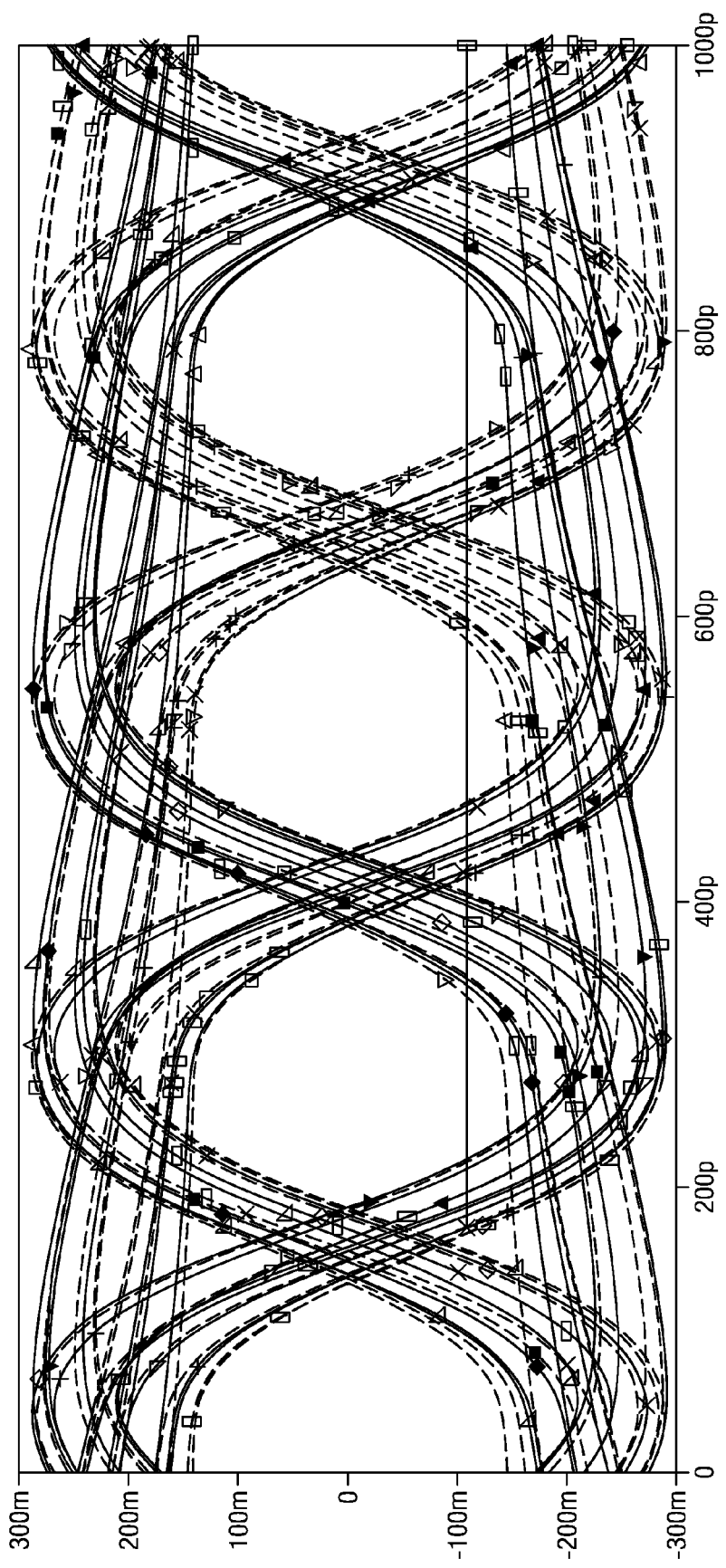
FIG. 8c is a waveform plot showing overequalization.

FIGS. 8a, 8b and 8c illustrates the basis for that determination made by the control circuit.

Figure 1:
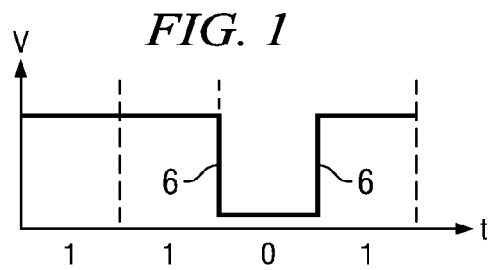
FIG. 1 is a typical binary data waveform.
Figure 2:
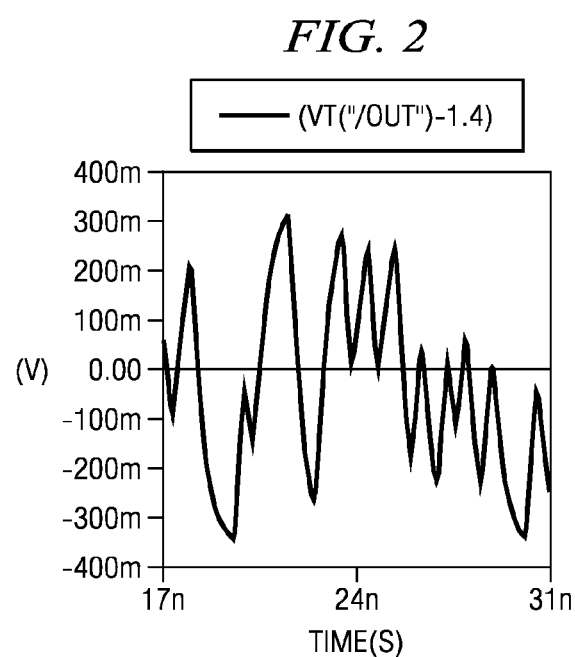
FIG. 2 is a binary data waveform after transmission over a line of significant capacitance.
Figure 3:
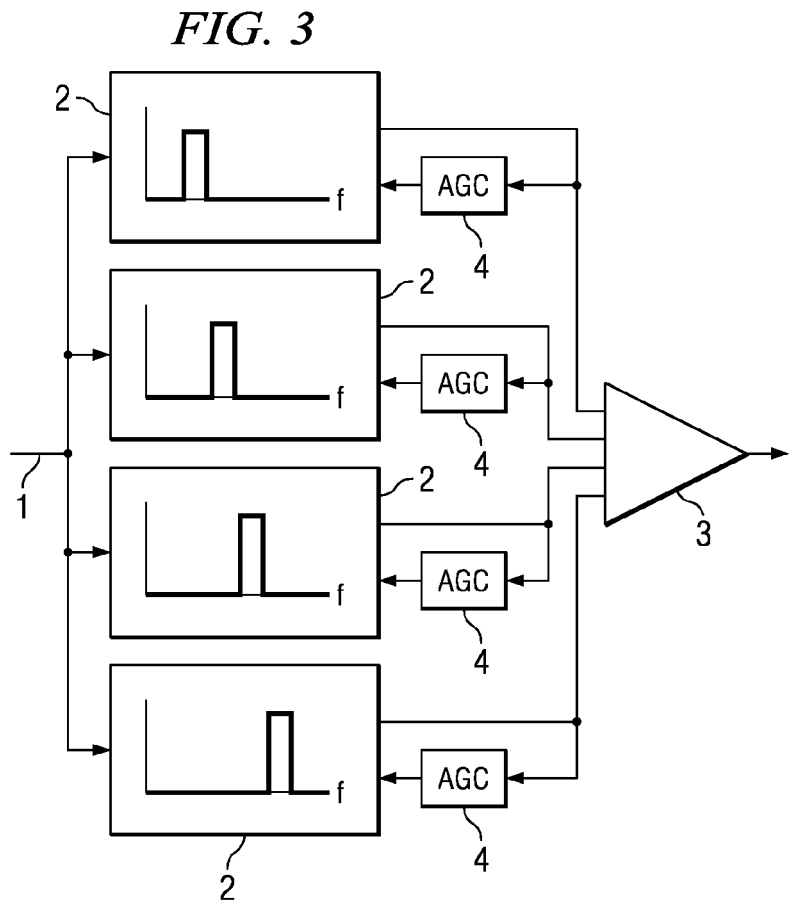
FIG. 3 is a known equalization filter.

FIG. 8a is a plot of the data waveform for the ideal situation where the data transmission line is perfectly compensated for by the equalization circuit. The plot (known as an eye diagram) has various traces of the data waveform overlaid. Each trace has a recent history (earlier than time=0.00 in the plot) of various patterns of logic "1"s and "0"s, followed by various patterns of logic "1"s and "0"s in the period of the diagram itself. The usefulness of this construction will become apparent from FIGS. 8b and 8c but note from FIG. 8a that all the transitions between "1"s and "0"s occur in the same place relative to the bit period boundaries. Note also that in this case the data rate is high and that it takes most of a bit period (about 250 ps in the scale of the plot) for the transition from logic "1" to logic "0" and vice versa, to take place. (High data rate is not an uncommon situation since there are many applications that require a large amount of data to be transmitted in a short time. This kind of situation is therefore more demanding than the highly idealized concept of a data waveform being a square wave with short transitions, for example as shown in FIG. 1.) In high data rate applications, where transitions take a large proportion of the bit period the high frequencies in the data waveform are important to ensure that they happen as quickly as possible, but in the example mentioned above of the transmission line that acts as a low pass filter it is just these frequencies that are attenuated.

FIG. 8b shows a similar plot to that of 8a for the case where the data waveform has been low pass filtered but has not been sufficiently equalized (and so remains low pass filtered). Here the transitions do not occur all in the same place.

For example, when there has been a long series of "1"s the transmission line becomes fully charged and the absence of high frequencies means that the transition towards "0" takes a long time and hence the transition is late. This dependence of the waveform on its history causes what is known as "inter-symbol interference" (ISI). (Similarly if there is a long series of "0"s the transition to the next "1" will also be late.)

Another extreme case is when there has been a long series of "1"s followed by a single "0" and then a final transition back to "1". The long series of "1"s fully charges the transmission line. The following "0" fails to fully discharge the line so the subsequent "1" returns the line more quickly towards being fully charged and so the transition to that subsequent "1" is early. (Similarly for a long series of "0"s followed by a single "1" before a final transition to "0" that final transition will also be early.)

The effects of other series of "1"s and "0" on the late or earliness of transitions can also be determined by experiment or simulation.

FIG. 8c is a similar plot for the case where again the transmission line has low pass filtered the data waveform but the equalizer has boosted the high frequencies too much. It turns out that in this situation, at least for the series of "1"s and "0"s mentioned above that whether a transition is early or late is reversed. Again the effects of other series of "1"s and "0" on the late or earliness of transitions can also be determined by experiment or simulation.

Figure 9:
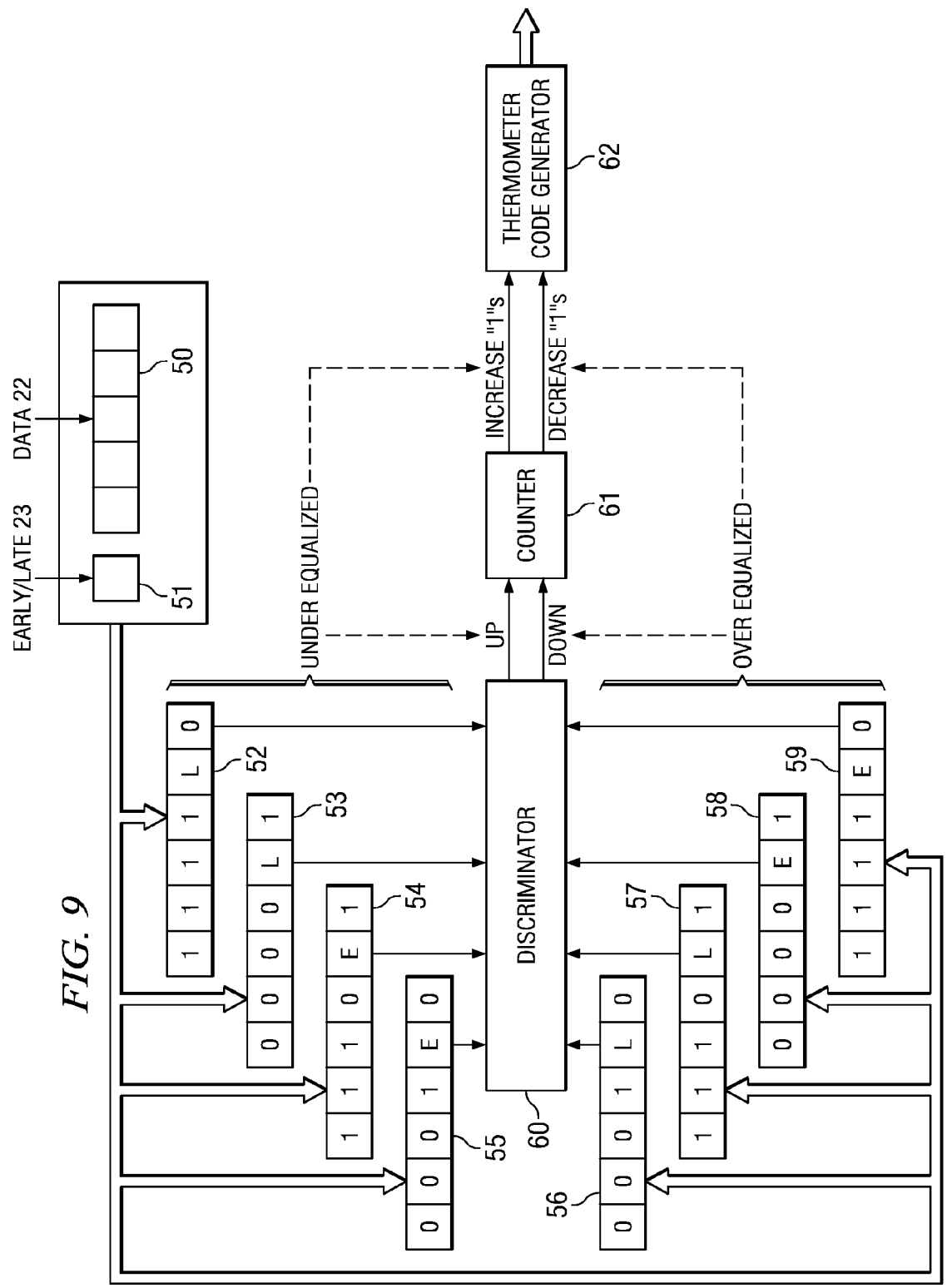
FIG. 9 is an exemplary control circuit.

FIG. 9 is an example of an implementation of the control circuit. The basic function of the control circuit is to interpret the indications of whether transitions are early or late to infer how to change the equalization provided. Continuing, of course, with the case of where a low pass filtering by the data transmission line is expected, the circuit of FIG. 9 utilizes the observations for that case about under and over equalization mentioned above in respect of FIGS. 8b and 8c. Thus the circuit of FIG. 9 is the preferred form of control circuit 21 for use with the equalization circuit 20 of FIG. 5. In other cases there may well be different results concerning the earliness or lateness of transitions and the control circuit should then be implemented accordingly.

In the exemplary circuit of FIG. 9 consecutive sampled data bits 22 and indications 23 of whether the transitions between them are early or late are buffered in shift register 50 and latch 51 respectively. The values in these are distributed in parallel to a number of code detectors 52 to 59. Each code detector waits for a particular series of 5 bits to occur and tests the whether the transition between the newest two bits is indicated to be a particular one of early or late. (In the FIG. and indication of late is marked as "L" and early as "E". If it is (i.e. the correct code and the correct early/late indication are present) it signals the discriminator unit 60.

Each detector has its own code combination of recent bits and the early/late indication for the transition between the newest two bits as given in Table 2.

TABLE 2

| Detector (reference in FIG. 9) | Data bits Old . . . New | Transition between newest two data bits is L = late or E = early | Inference that equalization is U = under equalized or O = over equalized |
|---|---|---|---|
| 52 | 11110 | L | U |
| 53 | 00001 | L | U |
| 54 | 11101 | E | U |
| 55 | 00010 | E | U |
| 56 | 00010 | L | O |
| 57 | 11101 | L | O |
| 58 | 00001 | E | O |
| 59 | 11110 | E | O |

The table also gives the inference that can be drawn from each detector's combination of data bit code and early/late indication, which are in accordance with the observations noted above when discussing FIGS. 8b and 8c.

Each time the data bits advance one bit along the shift register and a new early/late indication is provided and each detector 50 to 59, if its combination has occurred, signal its inference otherwise it sends no signal (or equivalently a signal indicating that it has no inference to make).

To cope with the effects of noise on the data waveform, which can lead to errors, the descriminator 60 is employed. This observes the inferences signalled by the code detector over a period of 8 bits. If, for that period, both conditions (1) and (2) below are met it signal that the equalization should be increased.

Condition (1) is that during the period the discriminator receives at least one inference of under equalization from detectors 52 and 53 and receives at least one inference of under equalization from detectors 54 and 55. This means that both preceding long and short runs of "1"s (or "0"s) are indicating the same thing.

Condition (2) is that none of the detectors 56 to 59 signal during the period an inference of over equalization, which would be inconsistent with the overall inference of condition (1) which is that there is under equalization.

The discriminator is also arranged to signal that the equalization should be both conditions (3) and (4) below are met.

Condition (3) is that during the period the discriminator receives at least one inference of over equalization from detectors 56 and 57 and receives at least one inference of under equalization from detectors 58 and 59.

Condition (4) is that none of the detectors 52 to 55 signal during the period an inference of under equalization.

Once each period is over the counts of inferences received kept by the discriminator are zeroed and the conditions are then checked for the period of the next eight bits.

The output of the discriminator is not applied immediately to adjust the equalization. First it is applied to a 10 bit counter 61 (which therefore has 1024 values), with the counter being incremented if the discriminator finds for under equalization during an 8 bit period and the counter being incremented if the discriminator finds for over equalization during an 8 bit period. The counter is connected to signal a thermometer code generator 62 to increment the number of "1"s in the thermometer code when the count of the counter 61 overflows (i.e. there has been a large number of successive periods of under equalization signalled by the discriminator) and to decrement the number of "1"s in the thermometer code when the count of the counter 61 falls to zero (i.e. there has been a large number of successive periods of over equalization signalled by the discriminator). The counter is reset to a value of 512 (i.e. to half full scale) on reaching zero or overflowing.

If the thermometer code is incremented then it has the effect in the exemplary equalization circuit described above in relation to FIG. 5 of switching out more of the component resistors of resistance 37, making resistance 37 larger. In turn this reduces the gain in the stop band of the equalization circuit and therefore increases the amount of equalization provided.

The effect of the counter is to make the response of the overall circuit quite slow, which is appropriate because the strength of the low pass filtering by the transmission line is unlikely to change very rapidly (e.g. it could well be affected by temperature).

Considering now the control circuit more generally than the example above, the rules used in the control circuit will depend on what type of filtering is expected from the transmission line and on the type of equalization provided (i.e. on their spectra).

Even for a particular case of this, the exact rules used in the control circuit to interpret the early/late information are not crucial and others may be used. In the example of FIG. 9, the codes chosen to be observed by the detectors 52 to 59 are those likely to produce the earliest and latest transitions and so are the ones most sensitive to incorrect equalization. Other codes could be used however and indeed a subset of those shown would work if there was at least one of each for inferring under and over equalization.

Further, even for a particular set of rules, logic circuits other than ones of the construction shown in FIG. 9 can, of course, be used to implement that.

The invention will need some care in initialisation. Initially there may be errors in the data samples which may well cause errors in the inferences made in the control circuit, which of course takes those data samples into account. Tests of the example circuit suggest, however, there is quite a wide band of levels of equalization from which the circuit will track to the optimum level. This is an effect of the rules which look for consistent inferences of under or over equalization before acting, which in the example circuit are implemented by the discriminator.

One method of providing an initial level of equalization is to take an educated guess or a measurement of the equipment in which the invention is to be used. The setting is then made on installation of the equipment and is likely to be near enough to the ideal level throughout its life.

Another method is to track through the equalization levels (or perform a binary search) until the error rate in the data is zero, or below a certain limit, and then thereafter allow the invention to control the equalization level. The error rate could be judged from consistency in the data as indicated by parity bits or cyclic redundancy checks or from standard patterns being transmitted successfully. In the circuit of FIG. 4 an error detect unit 9 is provided for that purpose.

The control unit 21 makes use of signals indicating whether particular edges are late or early. The early/late detector 17 is now described in more detail.

Figure 10:
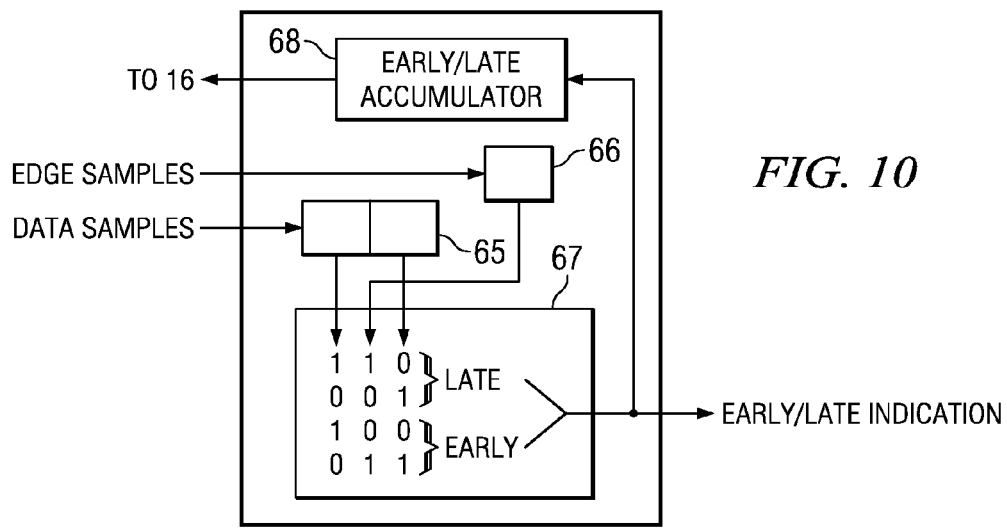
FIG. 10 shows an example of the early/late detector.

As is known in the art there are various methods of detecting whether an edge is early or late. In general, any of these may be used in the invention. A simple technique, as may be used in the invention is shown in FIG. 10. Data bits sampled by latch 11 are passed to the early late detection circuit 17, which receives them into a (two-stage) shift register 65. A secod sampling latch 18 (FIG. 4) is provided and is clocked from a second phase of the local clock provided by the phase interpolator 14. As mentioned earlier above, the latch 18 is clocked by the first phase 15 provided by the phase interpolator 14 to sample the data bits in the waveform at their mid-points and the second sampling latch 18 is clocked by the second phase to sample at the points half way between those points, i.e. at the points expected if the equalization is correct. The sample from the second sampling latch that is at the expected position of the edge between the two samples in the shift register is held in a latch 66. The value from that latch 66 and those in the shift register 65 are passed in parallel to a code recognizer 67 which determines whether the edge between data samples in the data waveform is earlier or later than the expected position. The codes and their implication is given in the Table 3 below.

TABLE 3

| Next most recent sample in shift register | Value of sample between the two data samples | Most recent data sample in shift register | Edge in data waveform between the two data samples is early or late? |
|---|---|---|---|
| 1 | 1 | 0 | Late |
| 0 | 0 | 1 | Late |
| 1 | 0 | 0 | Early |
| 0 | 1 | 1 | Early |
| 1 | X | 1 | No edge |
| 0 | X | 0 | No edge |

X="1" or "0"—For there to be an edge between them, two consecutive data bits rent (i.e. "10" or "01").

If the additional sample taken midway between the two data bits is the same as the earlier of the two data bits then the edge between them is late and if it is different then the edge is early.

The indications determined are passed to the equalization control circuit 21 and are utilized as described earlier above. (Note that in some alternative circuits the early later detector may operate directly on the data waveform in analogue form rather than the sampled form provided by latch 18 and/or latch 11.)

Also illustrated is a further use of the early/late information. The early/late indications are also passed to an early/late accumulator, which records whether in a set period the indications are on average that the edges are late or early, with the result of that being passed to the phase selector 16 to adjust the phase of the phase interpolator 14 so that the data waveform is indeed sampled at the mid-points of the data bits. (The phase supplied to the second sampling latch 18 is also adjusted so that it continues to sample at points half way between the sample points of the first sampling latch.) This use of the early/late information to lock the phase of the local clock to the data waveform is not essential to the invention; in general any of the other various methods known in the art may be used. It is, however, of course, a convenient method to use with the invention.

In the examples mentioned above the only a single parameter based on the early/late information is fed back to control the equalizer 20. In the invention however it is possible to feedback more than one parameter based on the early/late information.

Figure 11:
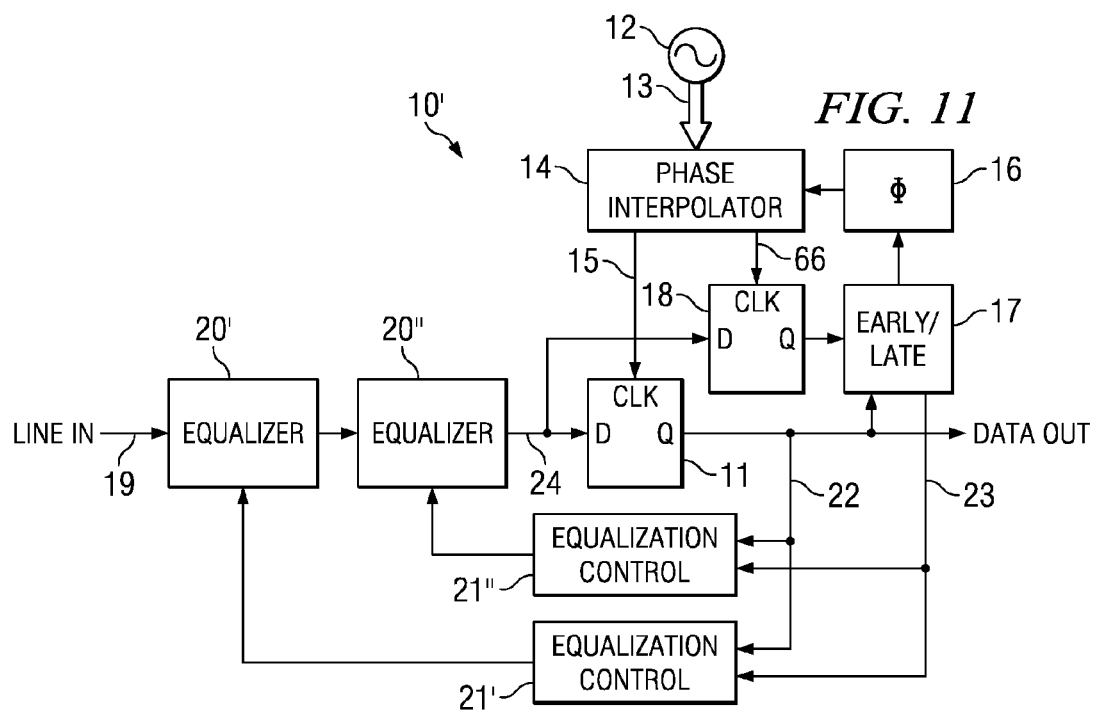
FIG. 11 is another example of the invention.

For example different code patterns or recent data samples 22 contain information about different frequencies. As mentioned above the series "10101010 . . . " has the highest fundamental frequency of any code pattern. The series "11001100 . . . " has a fundamental of half that frequency, and "11110000 . . . " has a fundamental of one quarter. A multi parameter example of the invention is shown in FIG. 11, in which items having the same function as those of the circuit of FIG. 4 are given the same reference numeral and are not described further.

Figure 12:
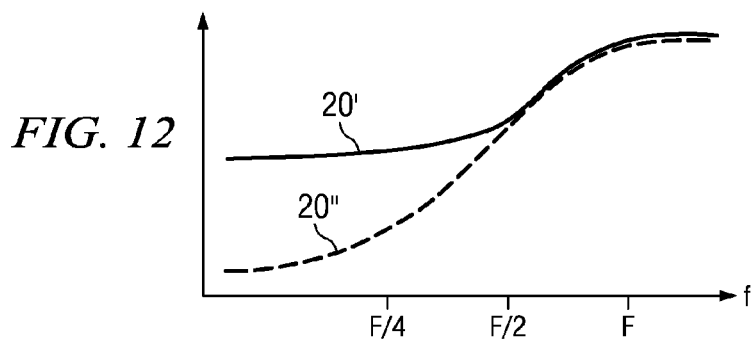
FIG. 12 is response characteristic of the equalization circuits in that example.

The circuit 10' comprises two equalization circuits 20' and 20" connected in series to operate on the incoming waveform 19 before it is sampled. FIG. 12 shows the spectra of these equalization circuits with the fundamental frequencies of "10101010 . . . " "11001100 . . . " and "11110000 . . . " marked respectively at F, F/2 and F/4. The second equalization circuit 20" is a filter circuit like that of FIGS. 5 and 6 with the capacitor set so that the filter passes the fundamental of the series "10101010 . . . " but attenuates lower frequencies. The first 20' is a similar filter circuit also with the capacitor set so that the filter passes the fundamental of the series "10101010 . . . " but attenuates lower frequencies. This filter rolls off towards lower frequencies at the same rate as 20" but reaches the bottom of its pass band at a higher frequency—at around F/2 (and so that pass band is not so deep as that of 20").

Each equalization circuit 20' and 20" has a respective control circuit 21' and 21" like that of FIG. 9. Control circuit 21" recognizes the same codes as shown in FIG. 9, which codes have long series of bits of the same value and so give information about the lower frequencies around F4 (consider "11110000 . . . "), the level of which it controls via equalization circuit 20".

Control circuit 21' uses codes recognizing the intermediate frequency of the series "11001000 . . . " The codes used are "00110", "11001", "01101" and "10010". The equalization circuit 20' controls, in response to control circuit 21', the level of F2. As it changes the level of F2 equalization circuit 20' also changes the level of F4, which is not desired, but control circuit 21" immediately responds to adjust the level of F4 to the desired level.

In this example the equalization circuit is split conveniently into two series connected circuits that are controlled by separate control units. Equalization circuits for more complex equalization spectra may require two or more parameters fed back to the same equalization circuit.

In the examples above the parameter fed back has been related to the gain in a band of frequencies of the equalization circuit (e.g. equalization circuit 20), (which conveniently has been effected by the control of resistance values in a filter circuit). According to the invention it is also possible to control other aspects of the response spectrum of the equalization circuit. For example, moving the position in frequency of a transition between a stop band and a pass band (which might conveniently be done by changing the value of a capacitance in a filter circuit, which can change the relative gain/attenuation of two particular frequencies).

Those skilled in the art to which the inventor relates will appreciate that various additions, deletions, substitutions and other modifications may be made to the described embodiments, without departing from the scope of the claimed invention.

The invention claimed is:
1. An equalizer comprising:
  a controllable equalization circuit connected to receive a data waveform, and to receive a control signal, and arranged to apply an equalization to the data waveform in accordance with the control signal and provide a resultant waveform;
  a data sampler connected to receive the resultant waveform from the equalization circuit and to provide data sampled from the resultant waveform;
  an early/late detector connected to receive the resultant waveform, arranged to examine the resultant waveform to determine whether transitions between logic levels fall earlier or later than expected and to provide early/late indications; and
  a control circuit connected to receive the data samples and the early/late indications from the early/late detector and connected to provide accordingly the control signal to the equalization circuit, wherein the control circuit is arranged to generate the control signal in response to the occurrence of particular patterns of the data samples received and from information as to whether a transition between two consecutive samples of each pattern is early or late by:
providing the control signal indicating an increase in the equalization to be provided by the equalization circuit if both:
the samples and early/late indication for a relatively long run of a particular logic level in the data followed by a transition and those for a relatively short run of a particular logic level followed by a transition both indicate that the equalizer is providing underequalization; and
no pattern to which the control circuit is responsive and its corresponding early/late indication indicates that the equalizer is providing overequalization; and
providing the control signal indicating a reduction in the equalization to be provided by the equalization circuit if both:
the samples and early/late indication for a relatively long run of a particular logic level in the data followed by a transition and those for a relatively short run of a particular logic level followed by a transition both indicate that the equalizer is providing overequalization; and
no pattern to which the control circuit is responsive and its corresponding early/late indication indicates that the equalizer is providing underequalization.

2. An equalizer as claimed in claim 1, wherein the control circuit comprises one or more code recognizers connected to detect when a particular pattern of samples has been received.

3. An equalizer as in claim 1, so arranged that the control circuit applies its rules to data samples received within a particular period of time, the rules being reapplied for later particular periods of time.

4. An equalizer as in claim 1, wherein the controllable equalization circuit comprises a filter having gain that is adjustable in a particular range of frequencies, which is connected to be so adjusted by the control signal from the control circuit.

5. An equalizer as claimed in claim 4, wherein the filter comprises an adjustable resistance that is connected to be adjusted by the control signal from the control circuit.

6. An equalizer as in claim 1, comprising a second data sampler connected to receive the resultant waveform and to provide samples thereof at the expected points of transitions between logic levels in the waveform, wherein the early/late detector is connected to receive those samples and also the resultant waveform in sampled form from the first data sampler, and is arranged to provide its early/late indications based on the sampled from the two data samplers.

7. An equalizer as in claim 6, comprising an error detect unit responsive to the data samples and connected to the control circuit to signal the occurrence of errors or the rate of those errors, the control circuit being arranged to vary the equalization provided in a particular manner until the errors meet a criterion, the control circuit thereafter being responsive to the data samples and the early/late information to control the controllable equalization circuit.

8. A method of equalization, comprising the steps of:
receiving a data waveform;
applying an equalization to the data waveform to provide a resultant waveform;
examining the resultant waveform to determine whether transitions between logic levels therein fall earlier or later than expected and to provide early/late indications;
sampling the resultant data waveform;
in response to the samples and the early/late indications adjusting the equalization applied, adjusting of the equalization by:
taking into account the occurrence of any of a plurality of particular patterns in the data samples and whether a transition between two consecutive samples of each pattern is early or late;
increasing the equalization if both:
the samples and early/late indications for a relatively long run of a particular logic level in the data followed by a transition and those for a relatively short run of a particular logic level followed by a transition both indicate that there is underequalization; and
no occurrence of a pattern of the plurality and its corresponding early/late indication indicates that there is overequalization; and
reducing the equalization if both:
the samples and early/late indications for a relatively long run of a particular logic level in the data followed by a transition and those for a relatively short run of a particular logic level followed by a transition both indicate that there is providing overequalization; and
no occurrence of a pattern of the plurality and its corresponding early/late indication indicates that there is underequalization.

9. A method of equalization as claimed in claim 8, wherein the equalization is adjusted by adjusting the gain applied to the data waveform in a particular range of frequencies.

10. A method as claimed in claim 8, comprising detecting errors in the data samples, and varying the equalization provided in a particular manner until the errors meet a criterion, and thereafter adjusting the equalization applied in response to the data samples and the early/late information.

11. A method of equalization as in claim 8, wherein the equalization applied has a high pass characteristic.

12. A method of equalization as claimed in claim 11, wherein the high pass characteristic has a pass band including the frequency of half the data rate of the data waveform.

13. A method as claimed in claim 8, wherein the examining the resultant waveform to determine whether transitions between logic levels therein fall earlier or later than expected at the expected points of transitions between logic levels in the waveform comprises: determining from two consecutive samples of the data waveform and the sample taken at the expected point of transition between them whether the transition is earlier or later than expected.

14. A method as in claim 8, wherein the criteria (i) and (ii) for the increasing or reducing of the equalization are applied to data samples received within a particular period of time, the criteria being re-evaluated for later particular periods of time.

15. An apparatus comprising:
an equalization circuit that receives an input signal and a control signal, wherein the equalization circuit includes:
a first MOS transistor that receives at least a portion of the input signal at its gate and that is coupled to the data sampler at its drain;
a second MOS transistor that receives at least a portion of the input signal at its gate and that is coupled to the data sampler at its drain; and a plurality of resistive branches that are coupled between the sources of the first and second MOS transistors, wherein each resistive branch includes:
an inverter;
a first resistor that is coupled to the source of the first MOS transistor;
a second resistor that is coupled to the source of the second MOS transistor; and
a third MOS transistor that is coupled between the first and second resistors and that is coupled at its gate to the inverter;
a data sampler that is coupled to the equalization circuit;
an early/late detector that is coupled to the data sampler, wherein the early/late detector generates a plurality of indications, and wherein each indication corresponds to whether transitions between logic levels of a signal received from the data sampler fall earlier or later than expected; and
a control circuit that is coupled to the data sampler and to the early/late detector, wherein the control circuit includes:
front end logic that is coupled to the data sampler and to the early/late detector;
a discriminator that is coupled to the front end logic;
a counter that is coupled to the discriminator;
a thermometer code generator that is coupled to the counter and to the inverter from each resistive branch within the equalization circuit, wherein the thermometer code generator provides the control signal to the inverter from each resistive branch within the equalization circuit.

16. The apparatus of claim 15, wherein the front end logic further comprises:
a latch that is coupled to the early/late detector;
a shift register that is coupled to the data sampler; and
a plurality of codes detectors that are coupled to the latch and the shift register.

17. The apparatus of claim 15, wherein the early/late detector further comprises:
a shift register that is coupled to the data sampler;
a latch that is coupled to the data sampler; and
a code recognizer that is coupled to the shift register, the latch, and the control circuit.

18. The apparatus of claim 15, wherein the data sampler further comprises a plurality of latches, wherein each latch is couple to equalization circuit.

* * * * *